J. Harvey.
Umbrella.

Nº 66586. Patented Jul. 9, 1867.

Witnesses.
Theo Tusch.
J. A. Service.

Inventor.
Jos Harvey
Per Munn & Co.,
Attorneys

United States Patent Office.

JOSEPH HARVEY, OF PHILADELPHIA, ASSIGNOR TO HARVEY & FORD, NEW YORK CITY, AND PHILADELPHIA, PENNSYLVANIA.

*Letters Patent No. 66,586, dated July 9, 1867.*

IMPROVEMENT IN BONE HANDLES FOR CANES, &c.

*The Schedule referred to in these Letters Patent and making part of the same.*

REISSUED

TO ALL WHOM IT MAY CONCERN:

Be it known that I, JOSEPH HARVEY, of Philadelphia, in the county of Philadelphia, and State of Pennsylvania, have invented a new and useful Improvement in the Manufacture of Bone Handles for Parasols, Canes, &c.; and I do hereby declare that the following is a full, clear, and exact description thereof, which will enable others skilled in the art to make and use the same, reference being had to the accompanying drawings, forming part of this specification Bone has long been used as a material for the manufacture of parasol, umbrella, and other handles, but it is not employed as extensively as it would be, provided stock could be obtained of sufficient size. To obviate this difficulty my invention consists in constructing a bone handle of a plurality of pieces, connected together in a novel and very secure manner, which will admit of a handle of the largest required size being made for various articles, such as canes, umbrellas, parasols, &c., &c.

The stock for bone-handles is obtained from the shin bones of beeves, as these furnish the largest pieces. These bones are sawed longitudinally, forming pieces more or less angular or irregular in form in their transverse section. In the accompanying drawings—

Figure 1:
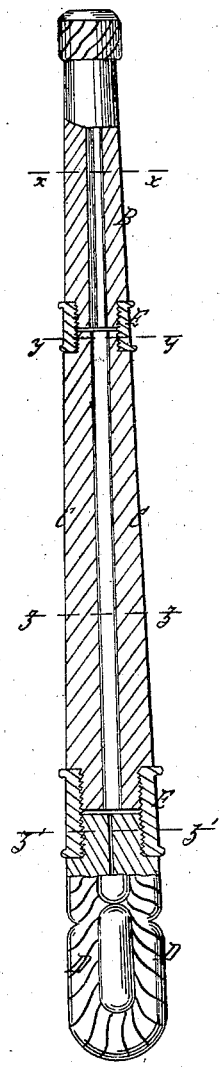
Figure 2:
Figure 3:
Figure 4:
Figure 5:

Figure 1 is a longitudinal central section of a handle constructed according to my invention.

Figures 2, 3, 4, and 5, transverse sections of the same, taken respectively in the lines $x\,x$, $y\,y$, $z\,z$, $z'\,z'$, fig. 1.

Figures 6, 7:
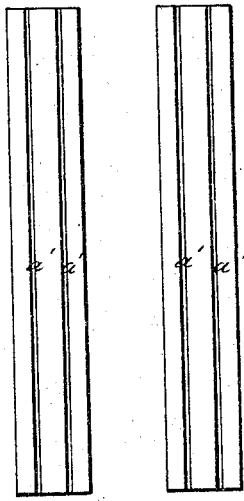

Figures 6 and 7, inner side views of two pieces of bone prepared to be secured together according to my invention.

Figure 8:

Figure 8, a transverse section or end view of the two parts shown in figs. 6 and 7, when connected together.

Figure 9:
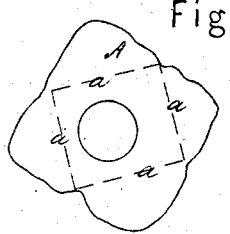

Figure 9, a transverse section or end view of a shin bone, from which the several pieces forming the handle are sawed.

Similar letters of reference indicate like parts.

A, fig. 9, represents an end view or transverse section of a shin bone which is sawed longitudinally, as indicated by the red lines $a$, to obtain the several pieces B C C D D, which are all shown in fig. 1. The inner and smaller part B of the handle is turned out of one of the longitudinal strips sawn from the bone A. The parts C C are two of said pieces made smooth at their flat or plane sides, and having two parallel longitudinal grooves $a'\,a'$, made in them to receive strips of flat wire $b$, covered with a thin cloth. These two parts are glued together, the wire $b$ giving an additional surface, and preventing any lateral movement of said parts. This will be fully understood by referring to figs. 3, 4, 5, and 8. The ends of these parts, when thus secured together, are turned in cylindrical form, and have screw-threads cut on them to receive circular pieces or ferrules E of bone, which are provided with internal screw-threads to screw on the ends of C C. These pieces or ferrules E are sawn transversely from the bone A, and turned in proper form, the part B being screwed into one of the ferrules E, as shown in fig. 1. The parts D D are secured together in the same way as the parts C C, and are screwed at one end into the outer part of the other ferrule E.

By this mode of construction it will be seen that bone handles, quite large in diameter and of any suitable length, may be obtained, and in certain cases, where unusually thick handles may be required, three or more parts like C C D D may be secured together, and turned or carved in any desired form. Hence the great difficulty hitherto experienced in the smallness of bone stock for handles is fully obviated, and a very neat, ornamental, and economical handle obtained.

Having thus described my invention, I claim as new, and desire to secure by Letters Patent—

The bone handle for parasols, umbrellas, canes, and other articles, constructed as described, consisting of the section B formed in one piece, sections C C and D D, attached together by means of the metallic strip $b$ covered with cloth, all secured together by means of the screw ferrules E, substantially as described for the purpose specified.

JOSEPH HARVEY.

Witnesses:
JOHN WHITE,
W. A. D. PIERCE.